United States Patent [19]

Bracesco

[11] Patent Number: 4,746,168
[45] Date of Patent: May 24, 1988

[54] MOTOR VEHICLE SEAT

[75] Inventor: Roberto Bracesco, Turin, Italy

[73] Assignee: S.I.C.A.M., S.p.A., Turin, Italy

[21] Appl. No.: 888,922

[22] Filed: Jul. 22, 1986

[30] Foreign Application Priority Data

Aug. 9, 1985 [IT] Italy ............................. 53697/85[U]

[51] Int. Cl.⁴ ............................................. A47C 7/02
[52] U.S. Cl. .................................. 297/443; 297/284; 297/444
[58] Field of Search ................ 297/DIG. 3, 443, 444, 297/284, 440, 452

[56] References Cited

U.S. PATENT DOCUMENTS

| 2,302,969 | 11/1942 | McMahan ........................ 297/444 X |
| 2,706,518 | 4/1955 | Fleischer ............................. 297/444 |
| 3,323,835 | 6/1967 | Barecki ............................. 297/460 X |
| 4,065,181 | 12/1977 | Gunlock et al. ................. 297/460 X |
| 4,065,182 | 12/1977 | Braniff et al. .................... 297/460 X |
| 4,079,994 | 3/1978 | Kehl ................................... 297/440 |
| 4,103,968 | 8/1978 | Butterfield et al. ............. 297/284 X |
| 4,365,840 | 12/1982 | Kehl et al. ....................... 297/444 X |
| 4,568,124 | 2/1986 | Kanai ................................ 297/452 |
| 4,592,588 | 6/1986 | Isono et al. ..................... 297/460 X |

FOREIGN PATENT DOCUMENTS

| 476576 | 8/1951 | Canada .............................. 297/443 |
| 653211 | 11/1962 | Canada .............................. 297/460 |
| 607344 | 12/1934 | Fed. Rep. of Germany ...... 297/444 |
| 3522845 | 1/1986 | Fed. Rep. of Germany ...... 297/284 |
| 22094 | 10/1947 | Finland ............................. 297/444 |
| A2151131 | 7/1985 | United Kingdom ................ 297/444 |

Primary Examiner—Peter A. Aschenbrenner
Assistant Examiner—Thomas A. Rendos
Attorney, Agent, or Firm—Morgan & Finnegan

[57] ABSTRACT

In a motor vehicle seat including a seat part and a back each formed by a support frame and a padding of foamed plastics material with an outer cover fixed to the support frame, attachment counterframes provided with rapid engagement parts which are releasably engageable with complementary engagement parts the support frames are incorporated in the padding of the seat part and the back.

6 Claims, 2 Drawing Sheets

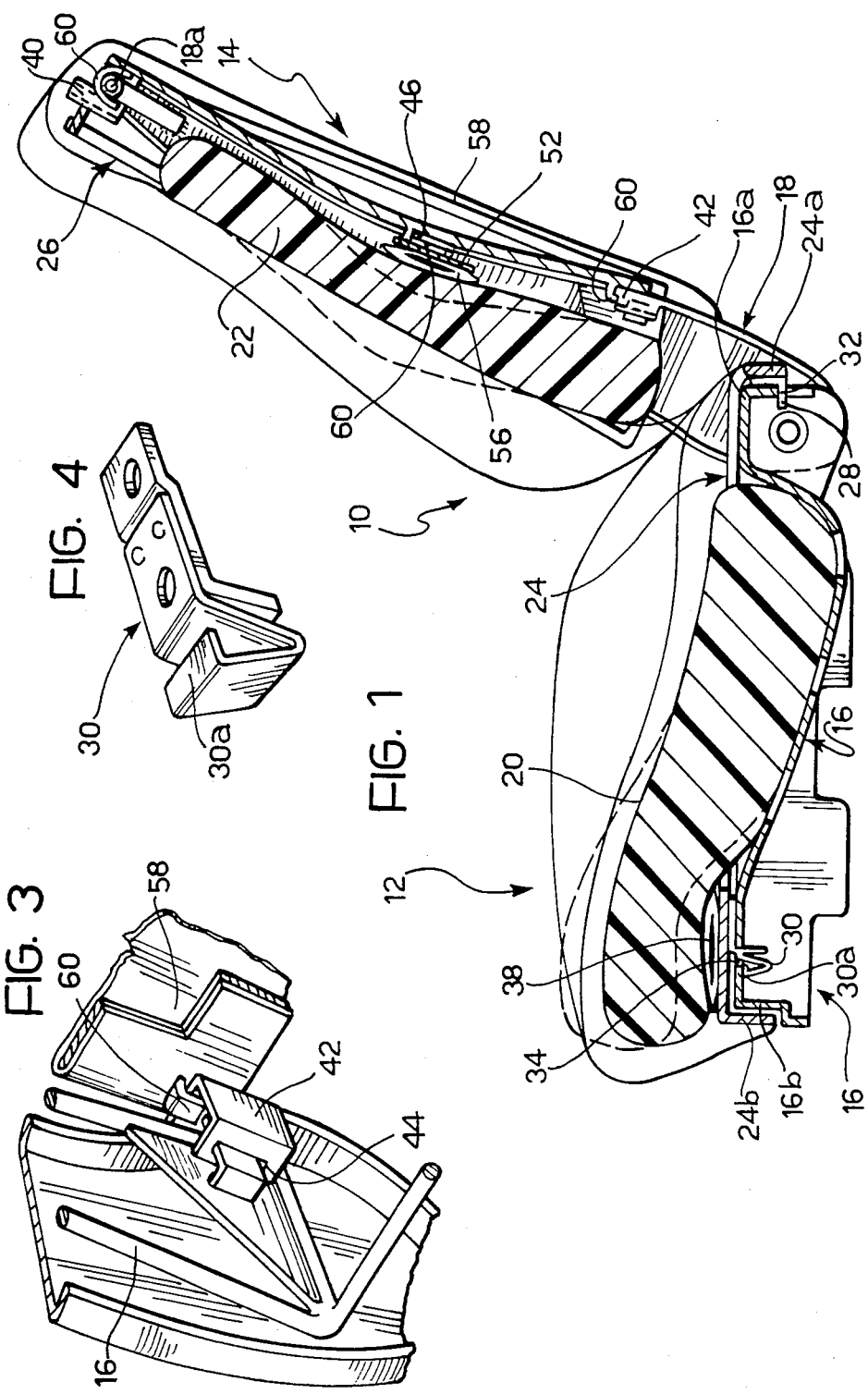

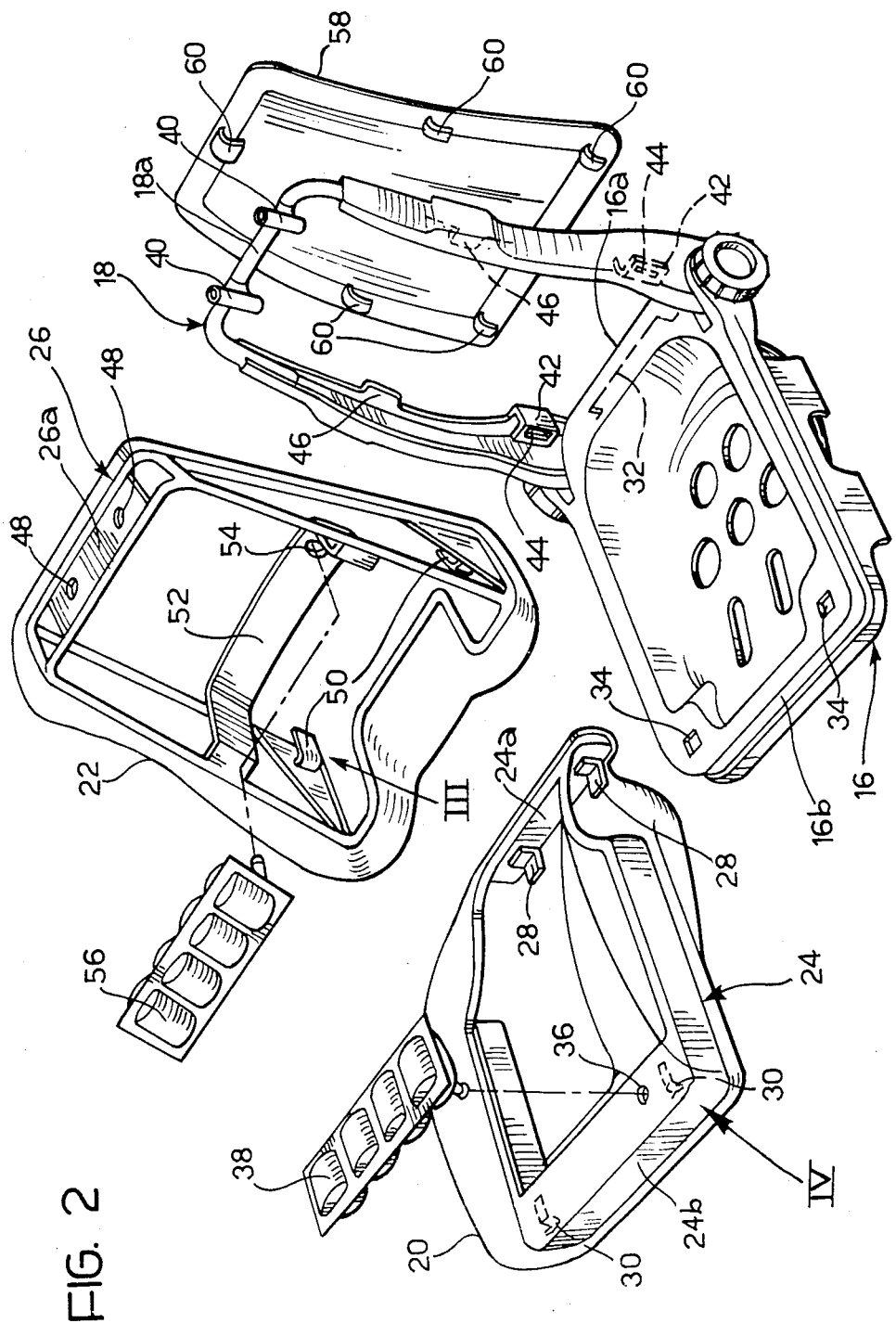

MOTOR VEHICLE SEAT

The present invention relates generally to motor vehicle seats of the type comprising a seat part and a back each formed by a support frame and a padding of foamed plastics material with an outer covering fixed to the support frame.

Conventionally, in motor vehicle seats of the type mentioned above, the paddings of the seat part and the back with their coverings are applied directly to the respective support frames during manufacture of the seat by various techniques which usually provide for the permanent interconnection of these components.

As a result of this operation, the seat is consequently given a definitive conformation both as regards the shape in general and as regards any auxiliary devices incorporated therein.

Furthermore, these conventional techniques do not allow the user to replace any parts of the seat upholstery, for example, following deformation of the padding due to prolonged use of the seat or damage of the outer covering caused by cigarette burns, staining, etc.

A further disadvantage lies in the complexity of the production lines for manufacturing such seats, particularly with regard to the equipment for the transfer and automatic assembly of the finished seats in the vehicles.

The object of the present invention is to avoid these disadvantages and to provide a motor vehicle seat of the type defined above which is made so as to enable it to be arranged in the form of sub-units which are assembled together in a final stage after mounting of the seat frame in the motor vehicle.

In order to achieve this object, the present invention provides a motor vehicle seat of the type defined at the beginning, characterised in that an attachment counterframe provided with rapid engagement parts which are releasably engageable with complementary engagement parts of the support frame is incorporated in the padding of the seat part and of the back.

By virtue of this characteristic, the seat according to the invention enables the automatic lines for assembling the seats in motor vehicles to be simplified considerably in that it enables just the support frames to be installed in the vehicles initially, and the padding with its covering to be attached quickly afterwards without the need for auxiliary fixing members.

Furthermore, the sub-units constituted by a part of the support frame and the respective padding may be replaced by similar sub-units at any time or may have further auxiliary devices, such as adaptation and adjustment members not envisaged originally, added to it subsequently.

The covering for the rear part of the seat may also be applied in a similar manner and, moreover, the possibility of direct assembly on the frames of the seat before installation in the vehicle is not excluded.

Preferably, the rapid engagement parts of the counterframes and the complementary engagement parts of the support frames comprise irreversibly snap-engageable members which can be disengaged only as a result of external action.

Since the counterframes need fulfil only the fixing functions and thus do not have structural functions, they may be made with particularly simple and cheap structures, for example of steel wires, sheet metal, moulded plastics material, etc.

Further characteristics and advantages of the invention will become apparent during the detailed description which follows with reference to the appended drawings provided purely by way of non-limiting example, in which:

FIG. 1 is a schematic vertical sectional view of a motor vehicle seat according to the invention, FIG. 2 is an exploded perspective view of the seat, and FIGS. 3 and 4 are two enlarged perspective views of two details of the seat.

With reference to the drawings, a motor vehicle seat is generally indicated 10 and comprises a seat or cushion part 12 and a back 14 connected to the rear part of the cushion 12 at its lower end by conventional systems which normally allow adjustment of its inclination.

According to the invention, the cushion 12 and the back 14 each comprise a metal support frame 16, 18 to which a padding 20, 22, normally of foamed plastics material with an outer covering, is connected by a releasable rapid engagement system. In order to achieve this type of coupling, counterframes 24, 26 arranged for connection to the respective support frames 16, 18 without the interposition of auxiliary fixing members are incorporated in the paddings 20, 22. Thus, the seat is constituted in practice by three sub-units constituted respectively by the framework formed by the two support frames 16 and 18, the padding 20 with its counterframe 24, and the padding 22 with its counterframe 26.

In detail, the counterframe 24 has a generally quadrilateral shape with a rear side 24a provided with two tongues 28 projecting substantially horizontally and inwardly, and a front side 24b having two resilient hooks 30 beneath it, one of which is illustrated in greater detail in FIG. 4. In practice, it is constituted by a metal sheet bent into a V-shape pointing substantially vertically downwardly and with a bent free end 30a.

The tongues 28 are arranged to engage a complementary recess 32 formed in the rear part of the rear side 16a of the support frame 16, while the resilient hooks 30 are arranged to fit downwardly into two complementary apertures 34 formed at the ends of the front side 16b of the support frame 16 in the manner clearly illustrated in FIG. 1. It is evident that the padding 20 can be assembled on the frame 16 in an extremely simple, easy, and readily mechanisable manner by inserting the tongues 28 in the recess 22 from behind and subsequently snap-engaging the resilient hooks 30 in the apertures 34. Thus, the padding 20 is fixed irreversibly to the support frame 16 and its removal can be effected equally easily and quickly by means of an external force which tends to deform the resilient hooks 30 so as to allow them to be removed from the apertures 34.

An aperture 36 is also provided in the front side 24b of the counterframe 24 for the connection of a contractable and expandable pneumatic device 38 of known type interposed between the front side 24b and the rear part of the padding 20.

The support frame 18 has two upper attachment pins 40 constituted by simple pieces of tube welded substantially vertically to the upper side 18a of the frame 18, and two attachment brackets 42 provided with respective frontal slots 44 at its lower end. Between the upper side 18a and the two attachments 42 are also provided two intermediate abutments 46 the function of which will be clarified below.

The counterframe 26 has an upper side 26a with two holes 48 slidingly engageable by the two attachment pins 40, and two lower lateral projections 50 arranged to engage in the slot 44. Furthermore, the counterframe 26 has an intermediate cross member 52 which extends rearwardly of the padding 22 and is arranged to rest against the projections 46 of the frame 18. The cross member 52 has a hole 54 for the assembly of a pneumatic device 56 entirely similar to the device 38, interposed between this cross member 52 and the padding 22 and the function of which is to adjust the arching of the latter in known manner.

In order to assemble the padding 20 on the support frame 16, the apertures 48 are first engaged upwardly on the attachment pins 40 and the tabs 50 are then introduced into the respective slots 44 until the cross member 52 bears on the projections 46. Irreversible snap-engagement releasable as a result of an external action is also possible in this case, for example by providing the counterframe 26 with resilient hooks similar to the hooks 30 of the counterframe 24.

It should be noted that the two counterframes 24 and 26 do not need to fulfil any structural function since their sole task is to ensure that the paddings 20 and 22 are connected to the frames 16 and 18. Cnsequently, they may be formed with simple, light structures, for example of steel wire (as in the case of the counterframe 26 illustrated), sheet metal (as in the case of the counterframe 24 illustrated in the example), or moulded plastics material.

The seat 10 can also be equipped with a back panel 58 of flexible material having the function of covering the rear part of the back 14. This panel 58 has anchoring projections 60 for downward engagement on the upper side 18a, on the intermediate rest projections 46, and on the bracket attachments 42 of the support frame 18.

Naturally, the scope of the present invention extends to models which achieve equal utility by using the same innovative concept.

What is claimed is:

1. A motor vehicle seat comprising a seat part and a back part, wherein at least one of said seat part and said back part includes:
    a support frame;
    a padding of foamed plastic material having an outer cover;
    an attachment counterframe incorporated within said padding;
    rapid engagement coupling means provided on said support frame and said attachment counterframe, for releasably connecting said attachment counterframe and said padding carried thereon to the support frame, said coupling means including at least one coupling member on one of said support frame and said counterframe, said coupling member further being snap-engageable in a cooperating aperture of the other one of said support frame and said counterframe, so as to rigidly connect the counterframe to the support frame without deformation of the counterframe, said coupling member being located at a position which is accessible from under the support frame when said counterframe is connected to the support frame, and said coupling member being resiliently deformable, as a result of an external action, into a contracted configuration to permit disengagement of the counterframe from the support frame.

2. A motor vehicle seat as in claim 1, wherein said back part includes a support frame having two upper attachment pins projecting upwardly and two lower attachment brackets having slots, said back part having an attachment counterframe which includes an upper portion with a pair of holes which are slidably engageable by said attachment pins, the attachment counterframe of the back part also including a pair of coupling members on its lower portion engageable within said slots.

3. A motor vehicle seat as in claim 1, wherein said support frame has a rear surface with an attachment recess and an upper surface with two front apertures, the corresponding counterframe incorporated within the padding of the seat part having two substantially horizontal attachment projections in its rear sides which are slidably engageable with said attachment recess in the rear surface of said support frame and the counterframe of said seat part further including two coupling members projecting downwardly from its front side which are snap-engageable in said front apertures of the support frame.

4. A motor vehicle seat as in claim 3, further including a contractable and expandable pneumatic device for adjusting the height of the front part of the seat padding mounted onto the front side of the seat counterframe.

5. A motor vehicle seat comprising a seat part and a back part, wherein at least one of said seat part and said back part includes:
    a support frame having two upper attachment pins projecting upwardly, two lower attachment brackets having slots, and two intermediate abutments;
    a padding of foamed plastic material having an outer cover;
    an attachment counterframe incorporated within such padding which includes an upper portion with a pair of holes which are slidably engageable by said attachment pins, a pair of coupling members on its lower portion engageable within said slots, and an intermediate cross member which bears against the abutments, said intermediate cross member extending outwardly and rearwardly to the padding of the back part, and carrying a contractable and expandable pneumatic device for adjusting the arching of the padding; and
    rapid engagement coupling means provided on said support frame and said attachment counterframe, for releasably connecting said attachment counterframe and said padding carried thereon to the support frame, said coupling means including at least one coupling member on one of said support frame and said counterframe, said coupling member further being snap-engageable in a cooperating aperture of the other one of said support frame and said counterframe, so as to rigidly connect the counterframe to the support frame without deformation of the counterframe, said coupling member being located at a position which is accessible from under the support frame when said counterframe is connected to the support frame, and said coupling member being resiliently deformable, as a result of an external action, into a contracted configuration to permit disengagement of the counterframe from the support frame.

6. A motor vehicle seat as in claim 5, wherein said back part further comprises a back panel of flexible material adaptable for engaging the support frame of the back part.

* * * * *